United States Patent
Obi et al.

(10) Patent No.: US 7,911,454 B2
(45) Date of Patent: Mar. 22, 2011

(54) INFORMATION PROCESSING APPARATUS, POSITION DETECTING APPARATUS AND SENSING PART FOR PERFORMING A DETECTION OPERATION

(75) Inventors: Katsuhito Obi, Saitama-Ken (JP); Toshihiko Horie, Saitama-Ken (JP)

(73) Assignee: Wacom Co., Ltd, Saitama-Ken (JP)

( * ) Notice: Subject to any disclaimer, the term of this patent is extended or adjusted under 35 U.S.C. 154(b) by 794 days.

(21) Appl. No.: 11/812,668

(22) Filed: Jun. 20, 2007

(65) Prior Publication Data

US 2009/0207150 A1    Aug. 20, 2009

(30) Foreign Application Priority Data

Jun. 21, 2006   (JP) .................................. 2006-171571

(51) Int. Cl.
G09G 5/00   (2006.01)
(52) U.S. Cl. ....................................... 345/173; 178/18.03
(58) Field of Classification Search .................. 345/173, 345/174, 175, 177, 179; 178/18.01–18.09, 178/19.01–19.07
See application file for complete search history.

(56) References Cited

U.S. PATENT DOCUMENTS

| | | | | |
|---|---|---|---|---|
| 5,283,558 A | * | 2/1994 | Chan | 345/168 |
| 6,093,477 A | * | 7/2000 | Matsufusa et al. | 428/209 |
| 7,154,481 B2 | * | 12/2006 | Cross et al. | 345/173 |
| 7,372,455 B2 | * | 5/2008 | Perski et al. | 345/173 |
| 2005/0016746 A1 | * | 1/2005 | Sze et al. | 174/35 R |

* cited by examiner

Primary Examiner — Regina Liang
Assistant Examiner — Tom V Sheng
(74) Attorney, Agent, or Firm — Berenato & White, LLC (57) ABSTRACT

An information processing apparatus includes a casing, an operation surface disposed at a predetermined location of the casing and being operable from outside the casing, a first sense unit disposed under the operation surface to electrically detect contact on the operation surface, and a second sense unit disposed under the operation surface and the first sense unit to detect a position of an external position pointing device with respect to the operation surface based on electromagnetic interaction generated between said second sense unit and said external position pointing device, and an auxiliary conductor disposed between the first sense unit and the second sense unit, the auxiliary conductor including a flat surface portion and a slit portion extending from one end of said flat surface portion to an inside of the flat surface portion.

32 Claims, 8 Drawing Sheets

INFORMATION PROCESSING APPARATUS, POSITION DETECTING APPARATUS AND SENSING PART FOR PERFORMING A DETECTION OPERATION

CROSS REFERENCES TO RELATED APPLICATION AND CLAIM TO PRIORITY

The present application claims priority from Japanese Application No. JP2006-171572 filed on Jun. 21, 2006, the contents of which are incorporated herein by reference.

FIELD OF THE INVENTION

The present invention relates to an information processing apparatus such as a personal computer apparatus, a position detecting apparatus, usable with the information processing apparatus and a sensing part for performing a detection operation in the information processing apparatus and the position detecting apparatus.

BACKGROUND OF THE INVENTION

An information processing apparatus such as a notebook-sized personal computer apparatus uses a position input apparatus including a conventional position detecting apparatus to detect the position touched by a user's finger. This conventional position detecting apparatus includes a plurality of electrodes embedded in an operation surface to detect the user's finger by determining changes in electrostatic capacity between the electrodes that occur when the user's finger touches the operation surface.

In the notebook-sized personal computer apparatus, a position of a pointer displayed in a display portion changes in response to a change in the position of the user's finger with respect to the operation surface of the conventional position detecting apparatus. In order to detect the change in the electrostatic capacity between the electrodes with stability, the position detecting apparatus is typically provided with a conductor plate disposed below the electrode(s). This conductor plate is used to ground the conventional position detecting apparatus as an earth ground electrode.

Many small and portable electronic apparatuses such as the notebook-sized personal computer apparatus (described above) use the conventional position detecting apparatus described above. Since the conventional position detecting apparatus includes the conductor plate in the portable apparatus to provide a ground electric potential portion, a problem arises in that other electronic components/devices cannot be disposed under/near the conductor plate. This is due to the fact that an eddy current is induced in the conductor plate by an alternating field of the electrodes of the conventional position detecting apparatus. This eddy current affects operations of the portable electronic apparatuses and would affect any other electronic components/devices disposed near the conductor plate.

For this reason, it is difficult to position other electronic components/devices below or near the conductor plate. As a result, a problem arises in that the space under the conductor plate cannot be utilized effectively and there is a limited amount of space in which to arrange the other electronic components/devices of the portable electronic apparatuses.

SUMMARY OF THE INVENTION

In view of the above, the present invention provides an information processing apparatus, a position detecting apparatus, and a sensing part for performing a detection operation in which a plurality of position detecting units are positioned upon one another so that each position detecting unit is able to detect a position accurately and reliably.

Additional aspects and advantages of the present invention will be set forth in part in the description which follows.

The foregoing and/or other aspects and advantages of the present invention are achieved by providing a position detecting unit disposed under an operation surface at a predetermined location of a computer casing and being operable from outside the casing, a first sense unit to detect contact on the operation surface, and a second sense unit to detect a position of an external position pointing device with respect to the operation surface based on an electromagnetic interaction generated between the second sense unit and the external position pointing device. An auxiliary conductor is disposed between the first sense unit and the second sense unit. The auxiliary conductor includes a flat surface portion and a slit portion extending from one end of the flat surface portion to an inside of the flat surface portion.

Since the auxiliary conductor having the flat surface portion is located at a lower portion of the first sense unit, electric potential in the first sense unit can be stabilized and electric detection of contact to the operation surface can be performed accurately and reliably. Also, since the slit portion is formed in the flat surface portion of the auxiliary conductor, the second sense unit can stably and reliably detect whether the position pointing device approaches or contacts the operation surface based on the electromagnetic interaction. Consequently, a plurality of sense units can be arranged upon one another and other components may be arranged below the position detecting unit.

The second sense unit may be an electromagnetic system sense unit including a plurality of loop coils to detect the position of the position pointing device based on the electromagnetic interaction generated between the external position pointing device and the loop coils. The slit portion provided in the auxiliary conductor prevents the auxiliary conductor from hindering the electromagnetic interaction generated between the external position pointing device and the loop coils. Therefore, although there is a possibility that an eddy current is generated on the flat surface portion of the auxiliary conductor by an alternating field generated by the second sense unit, the flat surface portion of the auxiliary conductor is divided by the slit portion to prevent a large eddy current from flowing in the auxiliary conductor. As a result, influence of the eddy current on the detection operation can be minimized.

The first sense unit detects a change in electrostatic capacity generated between a first detecting electrode and a second detecting electrode when the operation surface is contacted from outside the casing, and the auxiliary conductor is a ground electric potential portion of the first sense unit. As a result, the first sense unit can satisfactorily detect a contact position based on the change in the electrostatic capacity.

Also, a shield member is provided at a lower portion of the second sense unit, and therefore the second sense unit can detect the contact position more reliably.

A display position of a pointer displayed on a display portion is controlled based on detection operations of the first and second sense units.

More specifically, when the operation surface is touched with a finger or object, the display position of the pointer can be controlled or changed based on the detection operation of the first sense unit. When the position pointing device approaches or contacts the operation surface, the display position of the pointer can be controlled or changed based on the detection operation of the second sense unit.

Further, since a display control unit reflects a change of the contact position detected by the first sense unit on the operation surface by changing a relative position of the pointer and also reflects a change of a close position or the contact position of the position pointing device detected by the second sense unit on the operation surface by changing an absolute position of the pointer, it is possible to perform accurate and reliable detection operations using the two sense units.

The foregoing and/or other aspects and advantages of the present invention are also achieved by providing a computer apparatus, including a housing having a plurality of electronic components disposed therein, and a position detecting unit having an operation surface exposed outside the housing, the position detecting unit including an electrostatic component, an electromagnetic component, and a reference conductor disposed between the electrostatic component and the electromagnetic component, the reference conductor having a planar shape and at least one elongated cut-out portion extending into the planar shape from one side of the reference conductor toward another side of the reference conductor.

The foregoing and/or other aspects and advantages of the present invention are also achieved by providing a position detecting apparatus, including at least one inductive component having electromagnetic characteristics, at least one capacitive component disposed adjacent to the at least one inductive component and having electrostatic characteristics, and at least one ground plate disposed between the at least one inductive component and the at least one capacitive component, the at least one ground plate having at least one elongated slit formed therein. The at least one inductive component generates an eddy current in the at least one ground plate, and the at least one elongated slit prevents the eddy current from flowing around the entire ground plate.

The foregoing and/or other aspects and advantages of the present invention are also achieved by providing a position detecting device usable with a computer apparatus, the device including an operation surface, a sensing unit to detect interactions with the operation surface, the sensing unit including a first sensor disposed under the operation surface and a second sensor disposed below the first sensor, and a reference voltage plate associated with at least one of the first sensor and the second sensor, the reference voltage plate having a cut out area.

The foregoing and/or other aspects and advantages of the present invention are also achieved by providing a position detecting device usable with a computer apparatus, the device including an operation surface, an electromagnetic sensing part disposed below the operation surface to detect an external object having an inductive component as the external object approaches or contacts the operation surface, and a ground plate disposed adjacent to the electromagnetic sensing part, the ground plate having a shape that corresponds to the operation surface with at least one elongated slit extending thereacross.

DESCRIPTION OF THE PREFERRED EMBODIMENT(S)

Reference will now be made in detail to the embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the embodiments and methods. The invention according to its various aspects is particularly pointed out and distinctly claimed in the attached claims read in view of this specification, and appropriate equivalents.

Figure 1:
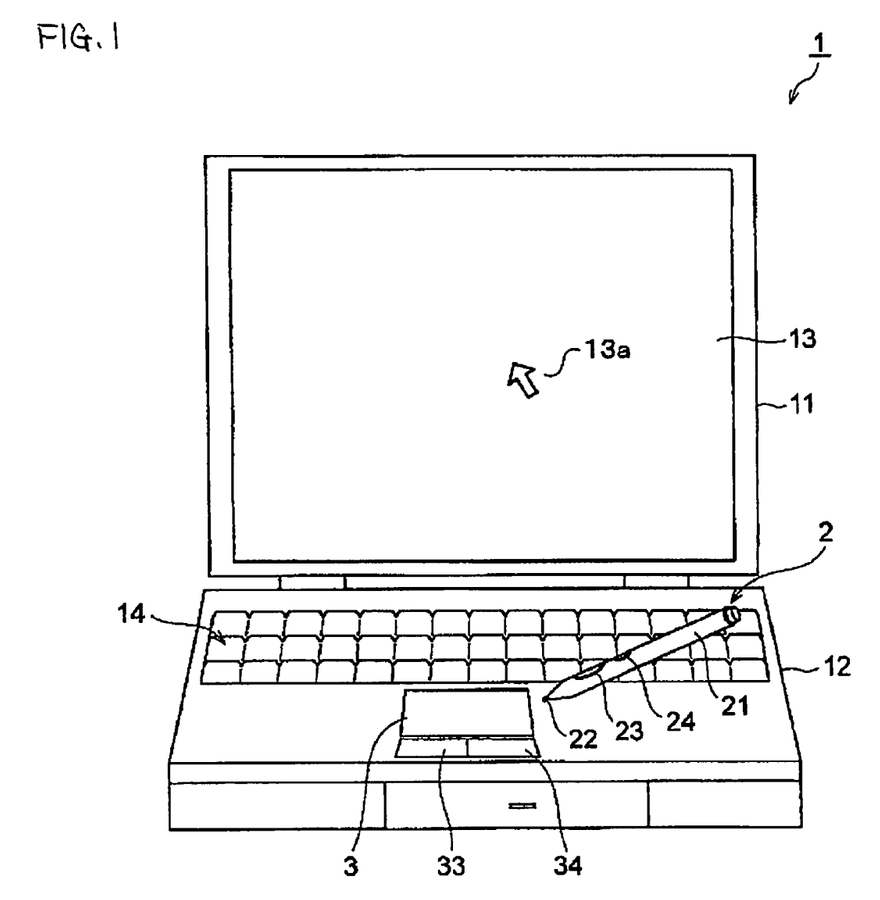
FIG. 1 is an perspective view illustrating a computer apparatus according to an embodiment of the present invention.

FIG. 1 is an external view illustrating a computer apparatus 1 according to an embodiment of the present invention. The computer apparatus 1 may be a notebook-sized computer including an upper casing (housing) 11 and a lower casing (housing) 12 that can be folded in a same manner similar to a flip-type mobile phone.

The upper casing 11 has a display 13 formed of a liquid-crystal display (LCD) panel provided therein. The display 13 displays a movable pointer 13a used to select and/or input items using an input device.

The lower casing 12 includes a key input unit 14 with various keys that can be operated/manipulated by a user. The lower casing 12 further includes a position detecting unit 3 and switches 33 and 34 that are disposed adjacent to the key input unit 14 in the lower casing 12.

The key input unit 14 includes various function keys such as number keys, character keys, and symbol keys and is adapted to detect depressions of these keys.

The position detecting unit 3 detects a contact position (e.g., absolute position or relative position) at which a user touches the position detecting unit 3 with a finger or an external object. An upper surface of the position detecting unit 3 is formed of a flat surface which can be substantially flush with an upper surface of the lower casing 12. Alternatively, the upper surface of the position detecting unit 3 may be a flat surface slightly recessed with respect to the upper surface of the lower casing 12. The flat surface of the position detecting unit 3 serves as an operation surface which can accept a position input operation performed by a finger of a user or an external object.

Also, the position detecting unit 3 is able to detect position input operations performed by a position pointing device 2 (e.g., a stylus).

As illustrated in FIG. 1, the position pointing device 2 includes a pen-like casing 21, and a pen-point 22 projects from the end of the pen-like casing 21. Switches 23 and 24, which are depressible by a user's finger, are arranged on a side surface of the casing 21. When the position pointing device 2 is in use, a user can hold the position pointing device 2 in the same manner in which an ink pen is held. In this manner, a user can press the pen-point 22 against the operation surface of the position detecting unit 3 to perform the position input operation.

When operated by the user, the position pointing device 2 is able to transmit a wireless signal to the position detecting unit 3 based on functions of a resonance circuit 26 (see FIG. 9) and an IC (integrated circuit) 25 (see FIG. 9) which are described below with reference to FIG. 9. The position detecting unit 3 is able to detect the position pointed to (indicated) by the position pointing device 2 by receiving and processing the wireless signal transmitted from the position pointing device 2. Additionally, the IC 25 (see FIG. 9) and the resonance circuit 26 (see FIG. 9) of the position pointing device 2 can detect a pushing force (e.g., stylus pressure) applied to the pen-point 22 of the stylus when the position pointing device 2 is operated, generate a signal (e.g., a pressure signal) indicative of the stylus pressure level, and transmit this signal together with a position signal to the position detecting unit 3 in order to indicate the position of the position pointing device 2 with respect to the position detecting unit 3.

Further, due to the functions of the IC 25 (see FIG. 9) and the resonance circuit 26 (see FIG. 9), the position pointing device 2 detects operational states of the switches 23 and 24, generates a signal (e.g., a switch signal) indicative of the operational states of the switches 23 and 24, and transmits this signal to the position detecting unit 3 together with the signal (e.g., the position signal and/or the pressure signal) to indicate the position of the position pointing device 2 with respect to the position detecting unit 3.

When receiving the signal transmitted from the position pointing device 2, the position detecting unit 3 detects the position indicated or pointed to by the position pointing device 2. Additionally, the position detecting unit 3 may also detect the stylus pressure applied to the pen-point 22 of the position pointing device 2 when the position pointing device 2 is operated and can detect the operational states of the switches 23 and 24.

The lower casing 12 further includes switches 33 and 34 provided on the upper surface thereof adjacent to the position detecting unit 3. The switches 33 and 34 are activated when depressed and can be operated in combination with the position detecting unit 3 and/or the key input unit 14.

Here, the operation surface of the position detecting unit 3 may be substantially square on which an orthogonal X-Y coordinates system is set for reference. A long side direction of the operation surface can be assumed to be the X direction and a short side direction of the operation surface can be assumed to be the Y direction. The position detecting unit 3 detects the position touched by a user's finger and/or the position indicated by the position pointing device 2 as an absolute position or a relative position in the X-Y orthogonal reference coordinates system described above.

Then, the computer apparatus 1 of FIG. 1 is able to execute functions of various application programs in accordance with instructions input by operation of the key input unit 14, the position detecting unit 3, and the switches 33 and 34. When the functions of the application programs are executed, various screens relating to data being processed are displayed on the display 13.

When the pointing or indication of a position is detected by the position detecting unit 3, the position of the pointer 13a displayed on the display 13 is controlled/changed in response to the detected position. The control/change of the position of the pointer 13a is executed based on control of a CPU (central processing unit) 41 (see FIG. 7) which is described below.

Figure 2:
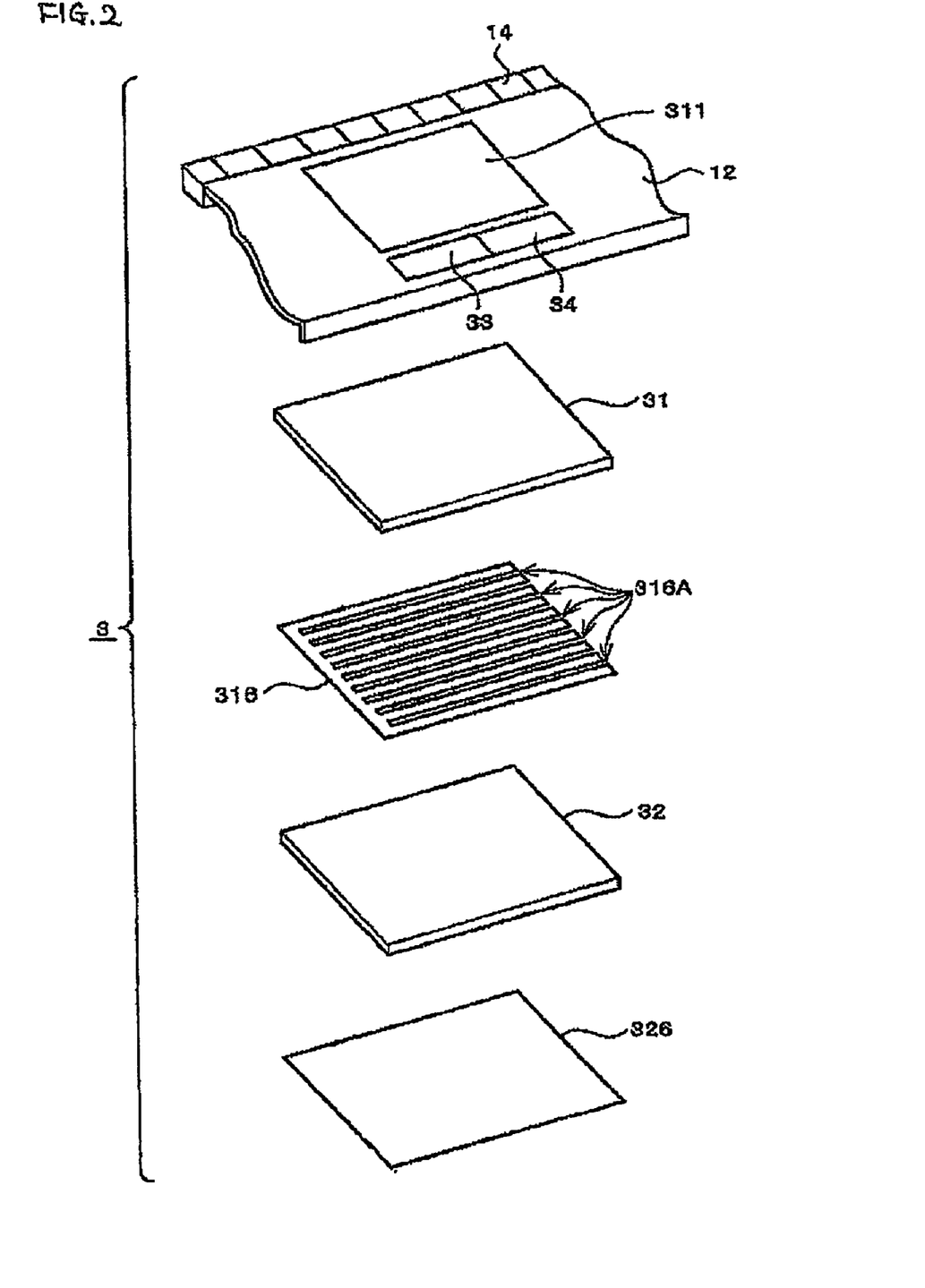
FIG. 2 is an exploded assembly view illustrating a portion of the computer apparatus of FIG. 1 according to an embodiment of the present invention.

FIG. 2 is an exploded assembly view illustrating a portion of the position detecting unit 3 of the computer apparatus 1 of FIG. 1. As illustrated in FIG. 2, a surface protecting later 311 serves as the operation surface of the position detecting unit 3. The surface protecting layer 311 may be disposed on the surface of the lower casing 12. A first sense unit 31 is located under the surface protecting layer 311 to detect whether the surface protecting layer 311 is directly touched with a finger or the like (e.g., an external object).

In the present embodiment of the invention, the first sense unit 31 is also used to point to the relative position (e.g., a relative position unit). A ground (GND) layer 316 (e.g., auxiliary conductor or reference conductor) is disposed under the first sense unit 31. The ground layer 316 is a ground electric potential portion of the first sense unit 31 and has a plurality of slits 316A formed therethrough.

A second sense unit 32 is located under the ground layer 316. The second sense unit 32 detects operations performed by the position pointing device 2 (see FIG. 1). In the present embodiment of the invention, the second sense unit 32 can also be used to point to the absolute position (e.g., an absolute position unit). Further, a shield plate 326 is disposed under the second sense unit 32 to shield other electronic components in the computer apparatus 1 from electromagnetic interference (EMI). For this reason, the shield plate 326 may be made of conductive material (e.g., metal).

Figure 3:
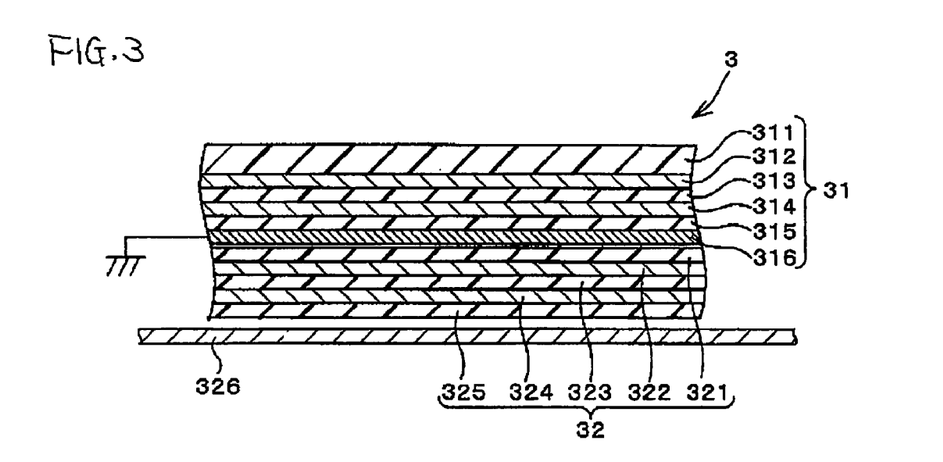
FIG. 3 is a fragmentary cross-sectional view illustrating a position detecting unit according to an embodiment of the present invention.

FIG. 3 is a cross-sectional view illustrating the position detecting unit 3. As shown in FIG. 3, the position detecting unit 3 has an arrangement composed of 11 layers (excluding the shield plate 326) laminated in the vertical direction. It should be understood, however, that other numbers of layers may alternatively be used in the position detecting unit 3. The surface protecting layer 311 exposed at the surface of the position detecting unit 3 is disposed on the uppermost portion thereof adjacent to the surface of the lower casing 12.

An X electrode (a first detecting electrode) 312 and a Y electrode (a second detecting electrode) 314 are located vertically adjacent to each other and an insulating layer 313 is disposed between the X electrode 312 and the Y electrode 314 to insulate the X electrode 312 and the Y electrode 314.

An insulating layer 315 is disposed under the Y electrode 314, and the ground (GND) layer 316 (the auxiliary conductor) is disposed under the insulating layer 315. The insulating layer 315 insulates the GND layer 316 from the Y electrode 314. The GND layer 316 is connected to the ground electric potential portion of the first sense unit 31 and is thereby grounded, as will be described below with reference to FIG. 5.

The surface protecting layer 311, the X electrode 312, the insulating layers 313 and 315, the Y electrode 314, and the GND layer 316 constitute the first sense unit 31. The first sense unit 31 detects a touch of a user's finger or a touch by an external object to the operation surface (e.g., the surface protecting layer 311) of the position detecting unit 3.

An insulating layer 321 is disposed under the first sense unit 31 and a loop coil(s) 322 (a first loop coil) is disposed under the insulating layer 321. The insulating layer 321 insulates the GND layer 316 of the first sense unit 31 from the loop coil 322. Another insulating layer 323 is disposed under the loop coil 322, and another loop coil(s) 324 (a second loop coil) is disposed under the insulating layer 323. The insulating layer 323 insulates the loop coil 322 from the loop coil 324. Another insulating layer 325 is disposed under the loop coil 324 to insulate the loop coil 324 from other components in the computer apparatus 1 (see FIG. 1) and/or the shield plate 326.

The insulating layers 321, 323, and 325 and the loop coils 322 and 324 constitute the second sense unit 32. The second sense unit 32 detects operations performed by the position pointing device 2 (see FIG. 1). Further, the shield plate 326 is made of a conductor such as metal and is disposed under the insulating layer 325. The shield plate 326 shields other components in the computer apparatus 1 (see FIG. 1) from electromagnetic interference (EMI) generated by the position detecting unit 3.

In the position detecting unit 3 having the structure described above, the surface protecting layer 311 is a plate-like member or a film made of a suitable material, such as a transparent or opaque synthetic resin. The surface protecting layer 311 should be made of an insulator that does not interfere with detection of a position input operation performed by a user's finger and/or the position pointing device 2.

Since the surface protecting layer 311 may be rubbed or depressed by a user's finger or the position pointing device 2, the surface protecting layer 311 may be made of a material which is excellent in abrasion resistance and shock resistance. Additionally, the surface protecting layer 311 may be made of a material which is also high in rigidity to protect the first and second sense units 31 and 32 disposed beneath the surface of the surface protecting layer 311.

A film or layer to improve abrasion resistance may be formed on the upper surface of the surface protecting layer 311, that is, the surface which serves as the operation surface of the position detecting unit 3. Additionally, a layer with a different frictional coefficient may also be formed on the surface protecting layer 311 in order to change the contact generated when the surface protecting layer 311 is touched with the pen-point 22 (see FIG. 1) of the position pointing device 2 (see FIG. 1).

The insulating layers 313, 315, 321, 323, and 325 may be plates or films made of insulating materials such as synthetic resins.

The insulating layers 313 and 315 are arranged to insulate the X electrode 312, the Y electrode 314, and the GND layer 316 from other conductors. These insulating layers 313 and 315 may cover the X electrode 312, the Y electrode 314, and the GND layer 316 or at least the conductive portions thereof. More particularly, the insulating layers 313 and 315 may be disposed in an area that corresponds to the operation surface of the position detecting unit 3.

It should be noted that the insulating layer 313 may be made of dielectrics selected such that an electrostatic capacitance between the X electrode 312 and the Y electrode 314 may be within a predetermined range.

Additionally, the insulating layers 321, 323 and 325 are arranged to insulate the loop coils 322 and 324 from other conductors such that they cover the loop coils 322 and 324 or at least the conductive portions thereof. More specifically, the insulating layers 321, 323 and 325 are disposed in the area that corresponds to the operation surface of the position detecting unit 3. The insulating layers 312, 315, 321, 323 and 325 may be formed by a suitable method such as coating, vapor deposition, printing (including spraying), pasting, or the like.

The X electrode 312 and the Y electrode 314 are formed by connecting a plurality of straight conductors, as will be described below with reference to FIG. 4. Also, the loop coils 322 and 324 are loop coils of one turn or a plurality of turns made of a conductor as will be described with reference to FIG. 6. The X electrode 312, the Y electrode 314, and the loop coils 322 and 324 may be made of a variety of metals such as copper, silver, metal compounds, or the like. The conductors for the X electrode 312, the Y electrode 314, and the loop coils 322 and 324 may be formed by suitable methods such as coating, printing (including spraying), pasting, or etching planar conductors.

Figure 4:
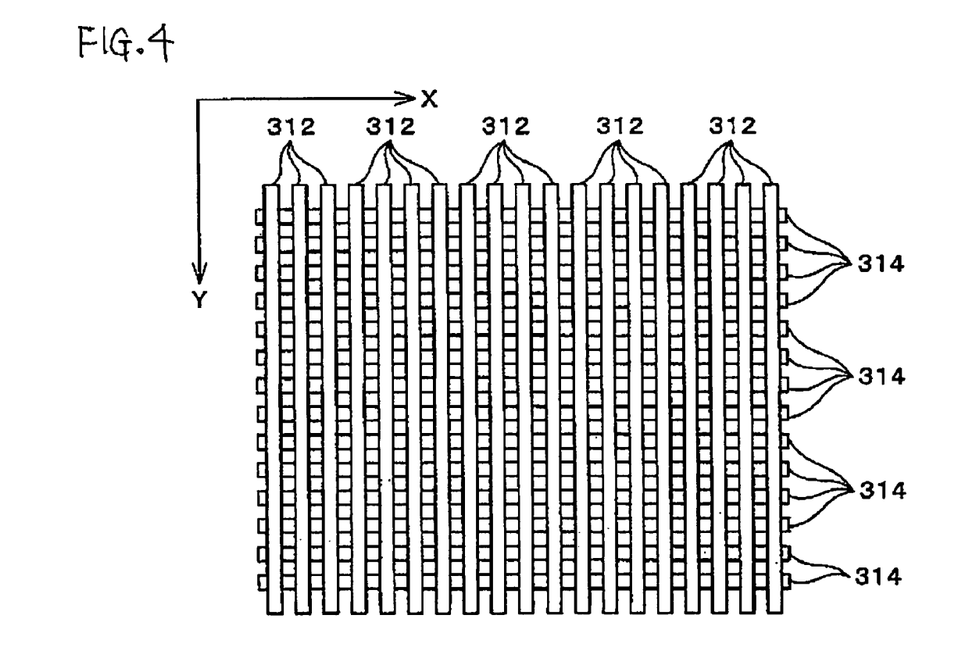
FIG. 4 is a plan view illustrating an exemplary arrangement of X electrodes and Y electrodes in the position detecting unit of FIGS. 1 and 2 according to an embodiment of the present invention.

FIG. 4 is a plan view illustrating the X electrode(s) 312 and the Y electrode(s) 314 disposed in the first sense unit 31. In order to simplify the description and to understand the present invention more clearly, the insulating layer 313 and other layers are not illustrated in FIG. 4.

As illustrated in FIG. 4, the position detecting unit 3 includes a plurality of X electrodes 312 and a plurality of Y electrodes 314. The X electrodes 312 are straight conductors extending along the Y direction. The X electrodes 312 are arrayed in parallel to each other along the X direction.

The Y electrodes 314 are straight conductors extending along the X direction and are arrayed in parallel to each other along the Y direction. The X electrodes 312 and the Y electrodes 314 are perpendicular to each other in the first sense unit 31 of the position detecting unit 3.

The X electrodes 312 and the Y electrodes 314 are electrically connected to an electrostatic capacitance detecting circuit 51 (see FIG. 8), which will be described below. The electrostatic capacitance detecting circuit 51 applies a predetermined voltage between each of the X electrodes 312 and each of the Y electrodes 314. Since the X electrodes 312 and the Y electrodes 314 are insulated from each other across the insulating layer 313 (see FIG. 3) which is also a dielectric, a predetermined electrostatic capacitance is generated between the X electrodes 312 and the Y electrodes 314.

Here, when the operation surface of the position detecting unit 3 is touched with the user's finger or an external object, the electrostatic capacitance between the X electrodes 312 and the Y electrodes 314 close to the position of contact (e.g., where the user's finger touches) on the operation surface of the position detecting unit 3 is changed. As a result, when the electrostatic capacitance detecting circuit 51 detects the change in the electrostatic capacitance between each of the X electrodes 312 and each of the Y electrodes 314, an X electrode and a Y electrode determined to be closest to the position of contact on the operation surface of the position detecting unit 3 are specified by the position detecting unit 3. Accordingly, the position of contact (e.g., where the user's finger touches) on the operation surface of the position detecting unit 3 can be detected. Also, in the position detecting unit 3, the GND layer 316 is disposed under the Y electrode 314.

Figure 5:
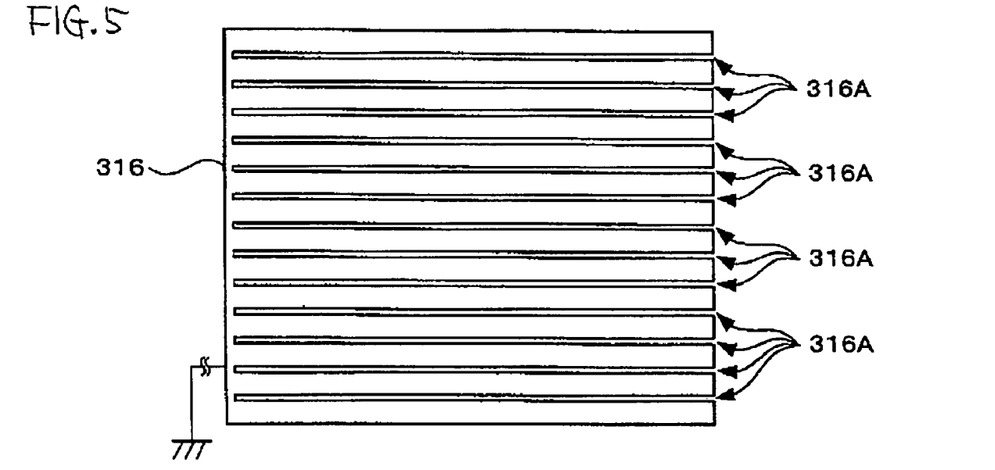
FIG. 5 is a plan view illustrating an exemplary arrangement of a GND (ground) layer in the position detecting unit of FIGS. 1 and 2 according to an embodiment of the present invention.

FIG. 5 is a plan view illustrating the GND layer 316 of the first sense unit 31. The GND layer 316 is shaped as a square and has elongated slits (recess portions) 316A formed therethrough. The GND layer 316 is provided to correspond to nearly the entire operation surface of the position detecting unit 3. Specifically, the GND layer 316 may be disposed in the area extending along the entire operation surface of the position detecting unit 3.

The GND layer 316 has a plurality of straight slits 316A extending in parallel from one end of the GND layer 316 to an inside of the GND layer 316. The slits 316A open at one end of the GND layer 316 and close at the other end of the GND layer 316. Thus, the GND layer 316, in its entirety, is shaped like a comb.

It should be noted that the directions of the slits 316A in the GND layer 316 may be changed freely and a plurality of the slits 316A need not be made parallel to each other. The GND layer 316 may be a conductive plate having cut-out slits extending in a plane thereof from a first side of the plate to a second side of the plate without extending completely through the entire plate (i.e., the slits extend partially in the plate).

The GND layer 316 is grounded in the inside of the lower casing 12 so that the change in the electrostatic capacitance between the X electrode 312 and the Y electrode 314 can be stably detected.

Figure 6:
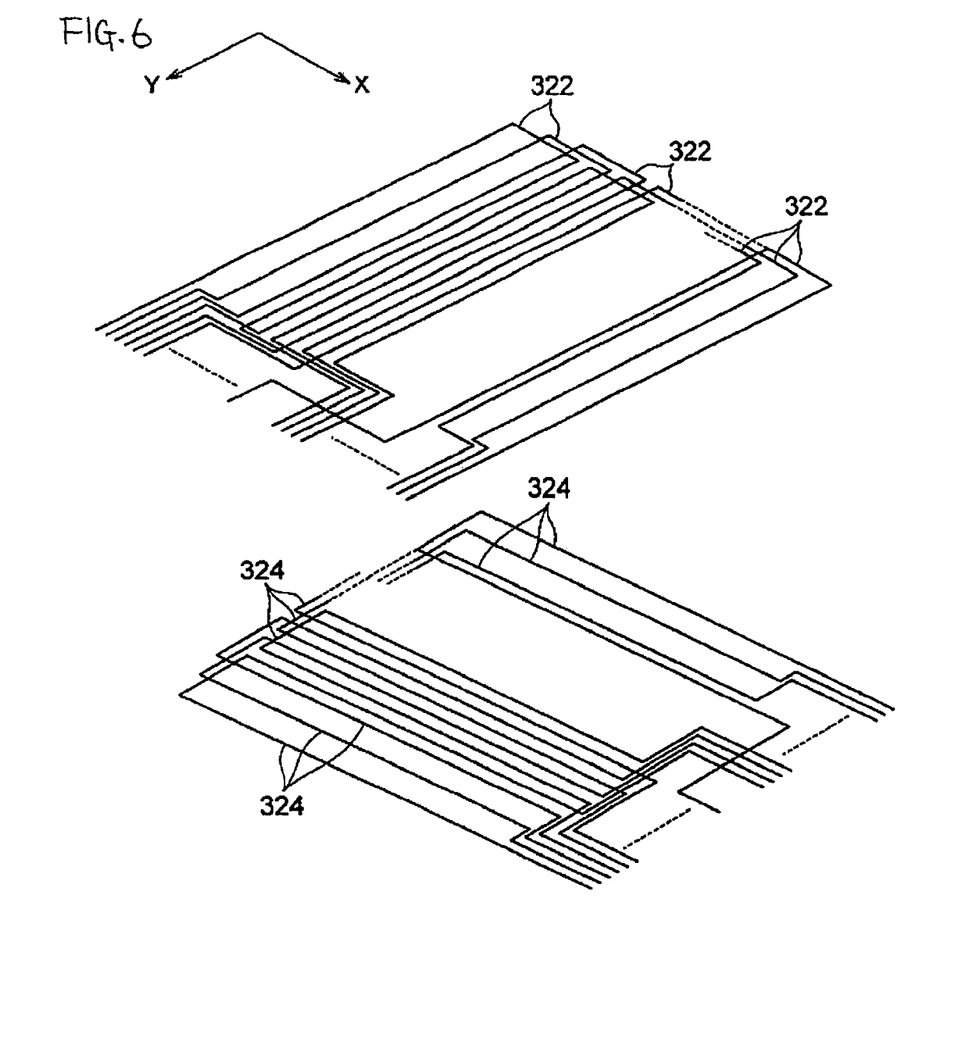
FIG. 6 is an exploded assembly view illustrating an exemplary arrangement of a loop coil in the position detecting unit of FIGS. 1 and 2 according to an embodiment of the present invention.

FIG. 6 is an exploded assembly view illustrating exemplary arrangements of the loop coils 322 and 324 of the second sense unit 32 of the position detecting unit 3.

As illustrated in FIG. 6, a plurality of the loop coils 322 and 324 may be arrayed along planes that are parallel to the operation surface of the position detecting unit 3. The respective loop coils 322 are arrayed in the X direction with respect to the operation surface of the position detecting unit 3 and the respective loop coils 324 are arrayed in the Y direction with respect to the operation surface of the position detecting unit 3.

The loop coils 322 and 324 are perpendicular to each other. These loop coils 322 and 324 are respectively connected to an electromagnetic system detecting circuit 600 (see FIG. 9) which will be described below. The loop coils 322 and 324 may be part of an electromagnetic position detecting unit 60 (see FIGS. 7 and 9).

Figure 7:
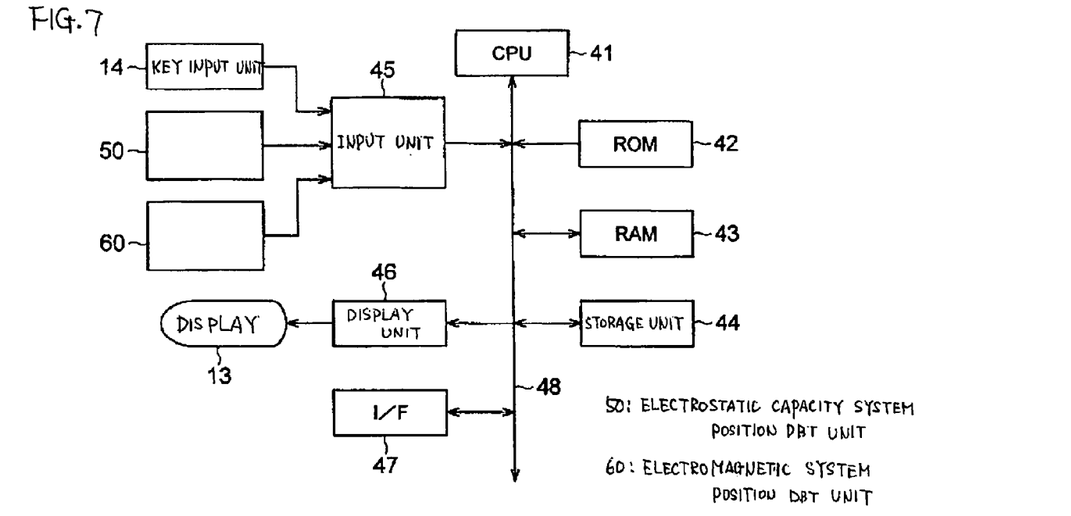
FIG. 7 is a functional block diagram illustrating a computer according to an embodiment of the present invention.

FIG. 7 is a functional block diagram illustrating the computer apparatus 1 of FIG. 1.

The computer apparatus 1 includes the CPU (central processing unit) 41 for controlling different units/components of the computer apparatus 1, a ROM (read-only memory) 42 for storing control programs executed by the CPU 41, a RAM (random-access memory) 43 which serves as a work area to temporarily store programs and data generated by the CPU 41, and a storage unit 44 for storing control programs, application programs executed by the CPU 41 and data relating to the execution of these programs.

Also, the computer apparatus 1 includes the key input unit 14 and an input unit 45 connected to the electrostatic capacitance position detecting unit 50, which detects the position of a user's finger or an external object, and the electromagnetic position detecting unit 60, which detects a position input operation performed by the position pointing device 2.

The electrostatic capacitance position detecting unit 50 detects the touch of a user's finger using the first sense unit 31 of the position detecting unit 3. The electrostatic capacity position detecting unit 50 then generates an operation signal indicative of the detected position. The electrostatic capacitance position detecting unit 50 may then output this operation signal to the input unit 45.

The electromagnetic position detecting unit 60 detects the position input operation performed by the position pointing device 2 using the second sense unit 32 of the position detecting unit 3. The electromagnetic position detecting unit 60 generates operation signals indicative of the detected position, the stylus pressure of the position pointing device 2, and the operational states of the switches 23 and 24 on the casing 21 (see FIG. 1). The electromagnetic position detecting unit 60 then outputs the operation signals to the input unit 45.

It should be noted that, when the position input operation of the position pointing device 2 is to be detected using the second sense unit 32, the state in which a tip end (that is, pen-point 22) of the position pointing device 2 touches the surface protecting layer 311 may be detected and the state in which the tip end of the position pointing device 2 is moved close to the surface protecting layer 311 may also be detected.

The input unit 45 generates operation information corresponding to the keys in the key input unit 14 being operated by a user. Also, the input unit 45 receives operation information detected by the electrostatic capacity position detecting unit 50 and the electromagnetic position detecting unit 60 based on the operation signal(s) input thereby. The CPU 41 executes various operations by acquiring the operation information received by the input unit 45.

Further, the computer apparatus 1 includes a display unit 46 to control the display 13 to display various screens based on screen display data provided by the CPU 41. The computer apparatus 1 further includes an interface (I/F) 47 connected to various external hardware components to transmit and receive data to/from these components.

The respective units/components of the computer apparatus 1, including the CPU 41, the ROM 42, the RAM 43, the storage unit 44, the input unit 45, the display unit 46, and the I/F 47 are connected to one another via a bus 48.

The CPU 41 may control operation of the respective units/components of the computer apparatus 1 by reading and executing a control program from the ROM 42. Additionally, the CPU 41 may read an application program from the storage unit 44 and execute the application program in the work area of the RAM 43 in order to process data.

During the execution of the control program and the application program, the CPU 41 may generate screen display data relating to the corresponding programs being executed and may output the same to the display unit 46. In turn, the display unit 46 can control the display 13 to display screens including the data.

Also, when the operation information received from the electrostatic capacitance position detecting unit 50 and/or the electromagnetic position detecting unit 60 (which corresponds to the position input operation performed by the user's finger or the position pointing device 2) is provided to the CPU 41 from the input unit 45, the CPU 41 may select/determine which contents being displayed on the display 13 are pointed to/input based on the operation information and the screen display data output to the display unit 46. In response, the CPU 41 may execute operations corresponding to the selected/determined contents.

Figure 8:
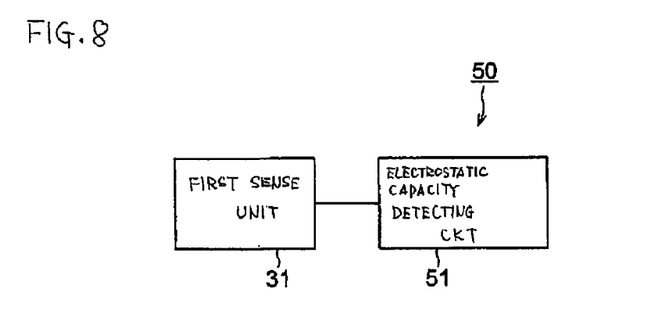
FIG. 8 is a block diagram illustrating an electrostatic capacitance position detecting unit according to an embodiment of the present invention.

FIG. 8 is a functional block diagram illustrating the electrostatic capacitance position detecting unit 50. As illustrated in FIG. 8, the electrostatic capacitance position detecting unit 50 includes the first sense unit 31 (also illustrated in FIG. 3) of the position detecting unit 3 and an electrostatic capacitance detecting circuit 51 connected to the X electrodes 312 (see FIG. 4) and the Y electrodes 314 (see FIG. 4) in the first sense unit 31.

The electrostatic capacitance detecting circuit 51 applies a predetermined voltage to each of the X electrodes 312 and the Y electrodes 314 such that a predetermined electrostatic capacitance is generated between the X electrodes 312 and the Y electrodes 314. When the user's finger touches the operation surface of the position detecting unit 3 to change the electrostatic capacitance between the X electrodes 312 and the Y electrodes 314, the electrostatic capacitance detecting circuit 51 may specify one or more of the X electrodes 312 and one or more of the Y electrodes 314 having a substantial change in electrostatic capacitance (e.g., the greatest change in electrostatic capacity from among all the X and Y electrodes 312 and 314). An intersection between the specified X electrode 312 and the specified Y electrode 314 may be indicated as the position of the operation surface being touched by a user.

In other words, the electrostatic capacitance detecting circuit 51 may obtain the position at which the user's finger touches the operation surface of the position detecting unit 3 by performing calculations based on the corresponding position and degree by which the electrostatic capacity is changed. Accordingly, the electrostatic capacitance detecting circuit 51 may determine coordinates (absolute position coordinates or relative position coordinates) which correspond to the position being touched by the user. Further, the electrostatic capacitance detecting circuit 51 generates an operation signal (operation information) indicative of the calculated coordinates and outputs this operation signal to the input unit 45 (see FIG. 7).

Figure 9:
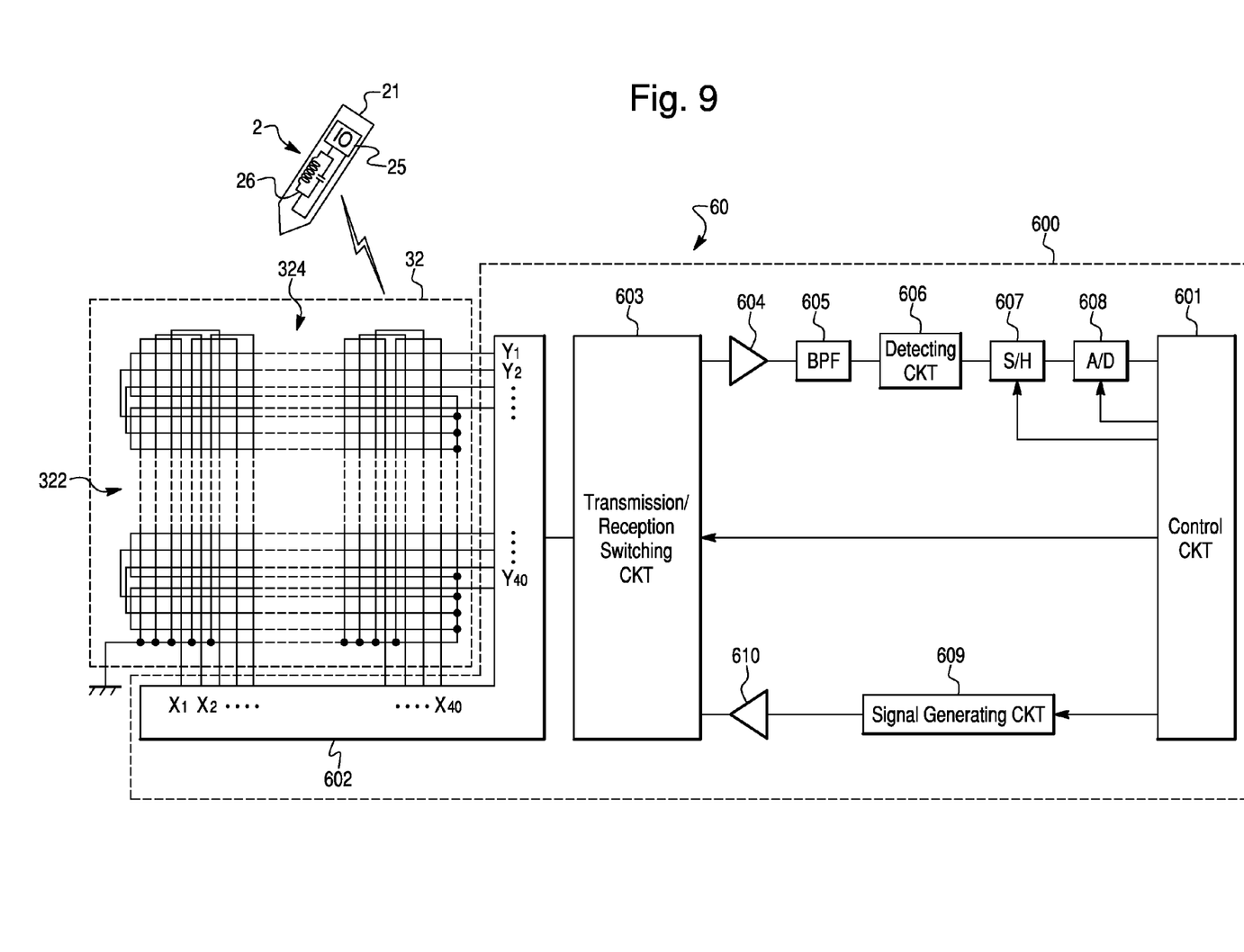
FIG. 9 is a schematic block diagram illustrating an electromagnetic position detecting unit according to an embodiment of the present invention.

FIG. 9 is a schematic block diagram illustrating the electromagnetic position detecting unit 60. As illustrated in FIG. 9, the electromagnetic position detecting unit 60 includes the loop coils 322 and the loop coils 324 of the position detecting unit 3 which are connected to an electromagnetic system detecting circuit 600.

It should be noted that the position pointing device 2 is illustrated in FIG. 9 together with the electromagnetic position detecting unit 60 in order to understand the present invention more clearly.

The position pointing device 2 includes a resonance circuit 26 having a coil, a capacitor (not illustrated), and an IC (integrated circuit) 25 which is connected to the resonance circuit 26.

The electromagnetic system detecting circuit 600 includes a selecting circuit 602 to select one loop coil from the plurality of loop coils 322 and 324 of the position detecting unit 3. The electromagnetic system detecting circuit 600 further includes a transmission and reception switching circuit 603 to switch between a transmission mode to transmit a signal via the loop coil selected by the selecting circuit 602 and a reception mode to receive a signal from the position pointing device 2 via the loop coil selected by the selecting circuit 602.

Also, the electromagnetic system detecting circuit 600 further includes a control circuit 601 to control different units/components of the electromagnetic system detecting circuit 600, an amplifying circuit 604 to amplify a signal output from the transmission and reception switching circuit 603, a BPF (bandpass filter) 605 to pass only a signal component of a predetermined frequency band with respect to the signal amplified by the amplifying circuit 604, a detecting circuit 606 to convert the signal component passed through the BPF 605 into a voltage value, a sample-and-hold (S/H) circuit 607 to hold this voltage value during a predetermined time period, an A/D (analog-to-digital) converting circuit 600 to convert the voltage value held in the sample-and-hold circuit 607 into digital data and to output the digital data to the control circuit 601, a signal generating circuit 609 for generating an oscillation signal with a predetermined frequency based on control of the control circuit 601, and an amplifying circuit 610 (i.e., another amplifying circuit) to amplify the signal generated by the signal generating circuit 609 and to provide the thus amplified signal to the transmission and reception switching circuit 603.

The manner in which the electromagnetic system detecting circuit 600 may detect the position input operation performed by the position pointing device 2 is described below.

First, the control circuit 601 controls the selecting circuit 602 to select one loop coil and controls the transmission and reception switching circuit 603 so as to switch the operation mode to the transmission mode.

Subsequently, the control circuit 601 controls the signal generating circuit 609 to generate a signal with a predetermined frequency. This signal is amplified by the amplifying circuit 610 and is input through the transmission and reception switching circuit 603 to the selecting circuit 602 to cause an electric current corresponding to the amplified signal to flow through the loop coil selected by the selecting circuit 602. As a result, a magnetic field (alternating field) is generated around the selected loop coil.

Here, in the position pointing device 2, an induced electric current may flow in the resonance circuit 26 owing to the magnetic field generated around the selected loop coil of the electromagnetic system detecting circuit 600 such that the IC 25 begins operation in response to the electric current induced in the resonance circuit 26. The IC 25 generates a signal with a predetermined frequency (e.g., an oscillation signal) and provides the generated signal to the resonance circuit 26 to be transmitted from the resonance circuit 26 to the electromagnetic system detecting circuit 600.

The control circuit 601 of the electromagnetic system detecting circuit 600 switches the operation mode from the transmission mode to the reception mode by controlling the transmission and reception circuit 603 after operating in the transmission mode for a predetermined time period. That is, the control circuit 601 switches the transmission and reception switching circuit 603 from the transmission mode to the reception mode after the transmission and reception switching circuit 603 has been operating in the transmission mode for the predetermined time period.

When the operation mode is switched to the reception mode as described above, the signal generated by the signal generating circuit 609 is not output to the selecting circuit 602.

In the reception mode, the signal produced by the operation of the IC 25 in the pointing device 2 is received by the loop coil selected by the selecting circuit 602. More specifically, when the IC 25 is operated, the signal is applied to the resonance circuit 26 and an electric current corresponding to this applied signal flows through the resonance circuit 26. As a result, a magnetic field is generated around the resonance circuit 26 so that this magnetic field causes an induced electric current to flow through the loop coils 322 and 324.

The electric current flowing through the selected loop coil is then amplified by the amplifying circuit 604 and only the component of the predetermined frequency band is output to the detecting circuit 606 by the BPF 605. This component is converted into a voltage value by the detecting circuit 606 and is held in the sample-and-hold (S/H) circuit 607. The voltage value held in the sample-and-hold circuit 607 is converted into digital data by the A/D converting circuit 608 and is output to the control circuit 601.

The loop coils 322 and 324 are sequentially selected by the selecting circuit 602 to detect the electric current of each of the loop coils 322 and 324 that is induced by the magnetic field generated by the resonance circuit 26. Then, while the loop coils 322 and 324 are sequentially being selected by the selecting circuit 602, the control circuit 601 may specify the loop coil closest to the position pointed to by the position pointing device 2 based on the detected electric currents and may calculate coordinates of the pointed position by processing the digital data provided by the A/D converting circuit 608.

Also, while the electric current is flowing through the resonance circuit 26, the IC 25 in the position pointing device 2 detects stylus pressure applied to the pen-point 22 (see FIG. 1) and operational states of the switches 23 and 24 (see FIG. 1). The IC 25 may then change transmission timing and transmission time of the oscillation signal provided to the resonance circuit 26 to reflect the stylus pressure and the operational states of the switches 23 and 24. The changes of the transmission timing and the transmission time may be detected during subsequent processing performed when the voltage value held in the sample-and-hold circuit 607 is converted into the digital data by the A/D converting circuit 608. Then, the control circuit 601 in the electromagnetic system detecting circuit 600 may acquire the stylus pressure and the operational states of the switches 23 and 24 by performing a calculation on the digital data input from the A/D converting circuit 608.

Once the control circuit 601 receives the digital data indicating the stylus pressure, the operational states of the switches 23 and 24, and the position pointed to by the position pointing device 2, the control circuit 601 generates an operation signal indicative of the position pointed to/indicated by the position pointing device 2, the stylus pressure in the position pointing device 2, and the operational states of the switches 23 and 24 and outputs this operation signal (operation information) to the input unit 45 (see FIG. 7).

The computer apparatus 1 includes the electrostatic capacitance position detecting unit 50 to detect the position input operation performed by the user's finger and the electromagnetic position detecting unit 60 to detect the position input operation performed using the position pointing device 2. As a result, the computer apparatus 1 is able to individually detect a position input operation performed by the user's finger on the operation surface of the position detecting unit 3 and the operation performed using the position pointing device 2. Consequently, it becomes possible for a user to perform input operations by a plurality of methods with different feels of operation, and operability can be improved.

Also, since the first sense unit 31, which detects a position input operation performed by a user's finger, and the second sense unit 32, which detects a position input operation performed by the position pointing device 2 are arranged upon one another in the position detecting unit 3, the size of the position detecting unit 3 can be made small and compact. As a result, the lower casing 12 and the computer apparatus 1 can be made compact/thin while it is possible for a user to perform position input operations using either a finger or the position pointing device 2. Additionally, the position detecting unit 3 can be easily applied to small and/or portable electronic devices having a limited casing size.

Because conductive parts are not provided on the first sense unit 31 in order to be able to reliably detect the change of the electrostatic capacitance between the X electrode 312 (see FIGS. 3 and 4) and the Y electrode 314 (see FIGS. 3 and 4), the first sense unit 31 is disposed at the upper portion of the position detecting unit 3. Thus, the operation surface of the position detecting unit 3 is positioned at the upper surface of the lower casing 12 (see FIG. 1) (i.e., close to the user's finger), and the first sense unit 31 can be provided immediately below.

On the other hand, since the second sense unit 32, provided below the first sense unit 31, in the position detecting unit 3 is adapted to detect the position input operation performed by the position pointing device 2, a magnetic field (alternating field) is generated by an electric current flowing through the loop coils 322 and 324. Thus, when a conductor (such as a GND plate) is positioned above the second sense unit 32, an eddy current is induced in this conductor by the magnetic field generated by the loop coils 322 and 324. As a result, there is a possibility that an eddy current will flow through the GND layer 316 disposed in the first sense unit 31 (i.e., between the first sense unit 31 and the second sense unit 32). The eddy current flowing through the GND layer 316 hinders the detection operation of the second sense unit 32.

The influence of the eddy current flowing through the GND layer 316 can be suppressed considerably by forming the slits 316A in the GND layer 316. More specifically, since the GND layer 316 is partly divided by the slits 316A, the resistance created by the slits 316A makes it difficult for a large eddy current to flow through the plane of the GND layer 316 parallel to the operation surface of the position detecting unit 3. As a consequence, the influence of the eddy current on the detection operation of the second sense unit 32 can be suppressed such that the detection operation of the second sense unit 32 is made reliable and stable.

According to this arrangement, even when the second sense unit 32 is provided under the first sense unit 31, the detection of the position input operation of the position pointing device 2 can be performed stably and reliably. Therefore, the detection of the position input operations of a user's finger and the position pointing device 2 can be performed by the position detecting unit 3 disposed in the lower casing 12. Since the first and second sense units 31 and 32 of the position detecting unit 3 can be formed integrally, two separate detection devices need not be used to detect a user's finger and the position pointing device 2.

Also, since the slits 316A formed in the GND layer 316 prevent a large eddy current from occurring in the GND layer 316, various other electronic components can be arranged in the lower casing 12 under/near the first sense unit 31 and the second sense unit 32. In this case, the electronic components arranged under the first sense unit 31 are substantially protected from being affected by the GND layer 316. Consequently, the electronic components can operate in a stable manner.

Since other electronic components can be installed under the first sense unit 31 (and the second sense unit 32), the position detecting unit 3 can be applied to small or portable electronic devices having a casing size that is limited. Accordingly, this limited space can be utilized effectively.

Figure 10:
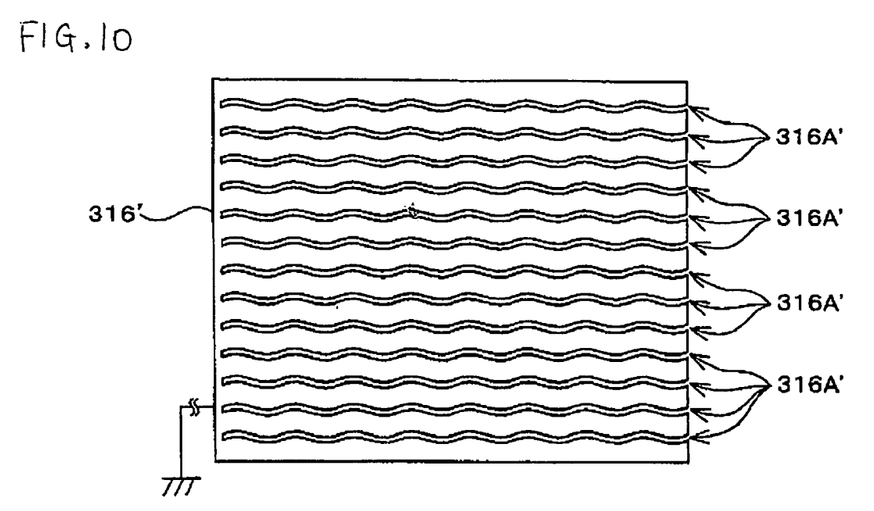
FIG. 10 is a plan view illustrating a GND layer according to an exemplary embodiment of the present invention.
Figure 11:
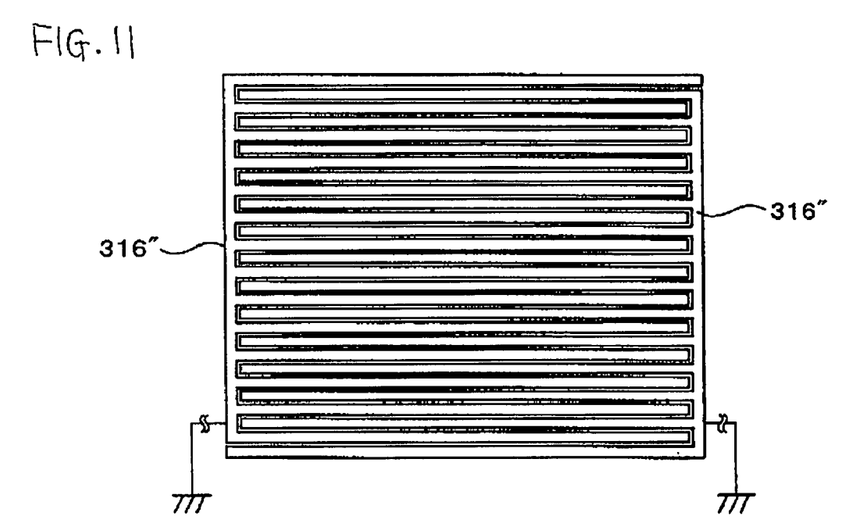
FIG. 11 is a plan view illustrating a GND layer according to another exemplary embodiment of the present invention.

Although the GND layer 316 is shown and described in previous embodiments as having a comb-like arrangement with straight slits 316A formed on a substantially square conductor, the present invention is not limited to this arrangement. The embodiments of the present invention may include GND layers of different size, shapes, and arrangements that are suitable for the purposes described herein. For example, as illustrated in FIG. 10, it is possible to use a GND layer 316' having a plurality of slits 316A' corrugated like curves formed thereon. In an alternate example, it is possible to combine a plurality of comb-like conductors. FIG. 11 is a plan view illustrating a GND layer(s) 316" according to another exemplary embodiment of the present invention.

As illustrated in FIG. 11, two comb-shaped GND layers 316" are disposed such that their respective slits 316A" may be alternately disposed with respect to each other without contacting each other. In this state, the two GND layers 316" are disposed in such a manner (e.g., interlaced) that they do not overlap with each other and do not contact each other. The two GND layers 316" are individually connected to ground.

The GND layer 316" may include a first GND layer 316" (left side of FIG. 11) having a plurality of first elongated conductors defining a plurality of first slits therebetween, and a second GND layer 316" (right side of FIG. 11) having a plurality of second elongated conductors defining a plurality of second slits therebetween. The first and second GND layers 316" are disposed such that the first elongated conductors are arranged in the second slits without contacting the first elongated conductors, and the second elongated conductors are arranged in the first slits without contacting the second elongated conductors.

The arrangement illustrated in FIG. 11 can be constructed of about the same thickness as that of the GND layer 316 illustrated in FIG. 2.

Alternate embodiments may also exist whereby slits may extend diagonally across the GND layer at an angle to the sides of the GND layer. As in previous embodiments, the slits prevent a large eddy current from being induced in the GND layer. In this arrangement, the side portion supports elongated conductive portions defined between the slits. The slits may extend in parallel across the GND layer.

In a further alternate embodiment, the slits are formed diagonally across the GND layer. As in previous embodiments, the slits prevent a large eddy current from being induced in the GND layer. In this case, the slits can be formed within the GND layer or the slits can be formed to extend inward from one side portion of the GND layer to another side portion of the GND layer without extending completely through the GND layer.

In the embodiments described above, when the arrangement illustrated in FIG. 11 is in use, since areas of grounded conductors are large, the operation of detecting the change of the electrostatic capacitance between the X electrode 312 and the Y electrode 314 can be stabilized.

Additionally, since the two GND layers 316" are prevented from contacting each other, even when the second sense unit 32 is disposed under the two GND layers 316", a large eddy current does not occur in the GND layers 316". Hence, the possibility that the GND layers 316" will hinder the detection operation of the electromagnetic position detecting unit 60 using the second sense unit 32 is minimized.

In addition, the shape of the conductor serving as the GND layer 316 may be varied as long as the occurrence of the eddy current can be suppressed by providing slits of an arbitrary shape which perform a similar function as the slit 316A. Additionally, the width and number of the slits 316A can also be varied. The GND layer 316 may have a variety of different shapes and slit arrangements as along as a large eddy current is prevented from being conducted therein.

For example, the GND layer 316 may be modified such that a flat surface conductor substantially parallel to the operation surface of the position detecting unit 3 is used as the GND layer 316, the slits 316A extending from one end of the conductor to the other end of the conductor are formed in the GND layer 316, and the conductor is divided into a plurality of conductive parts which are prevented from contacting each other in a plane defined by the conductor. Further, the conductor arranged in the plane may be divided into a plurality of conductors by slits 316A extending in the different directions. In this case, the divided conductors may be commonly connected to an electrode disposed outside the defined plane of the GND layer 316 (conductor).

In any case, a large eddy current can be prevented from flowing within the plane parallel to the operation surface of the position detecting unit 3 and any influence of the eddy current on the position detecting operation of the second sense unit 32 can be minimized.

It should be understood that any number of turns of the loop coils 322 and 324 may be used with the embodiments of the present invention. For example, the loop coils 322 and 324 may have one turn or a plurality of turns. In addition, the number of the loop coils 322 and 324 provided in the position detecting unit 3 can also be varied freely.

The widths of the conductors of the X electrode 312, the Y electrode 314, the loop coils 322 and 324 may have a variety of different values.

Further, the shape of the operation surface of the position detecting unit 3 illustrated in FIG. 1 need not necessarily be square. For example, other shapes (e.g., circle, rectangle, etc.) may alternatively be used for the operation surface of the position detecting unit 3. In this case, the shapes of the layers illustrated in FIG. 2, which constitute the position detecting unit 3 may be varied in accordance with the shape of the operation surface.

Additionally, the shapes and positions of the switches 33 and 34 can be varied freely, and more or less switches may be provided in the vicinity of the position detecting unit 3.

Further, it should be understood that the display 13 is not limited to a liquid-crystal display panel. Other types of display devices can be used with the present invention.

Also, while the position pointing device 2 has been shown and described in previous embodiments as pointing to a position by transmitting and receiving a wireless signal to/from the position detecting unit 3, the present invention is not limited to this arrangement. Other types of position pointing devices may alternatively be used with the embodiments of the present invention. For example, the position pointing device 2 may include a built-in power supply and may transmit a signal to the position detecting unit 3 in a one-way fashion. In this case, although there is a possibility that an eddy current will occur in the GND layer 316 due to the influence of the magnetic field generated by the resonance circuit 26 of the position pointing device 2, the occurrence of the eddy current can be suppressed by providing the slits 316A. Therefore, it is possible to reliably detect the operation performed by the position pointing device 2 in the position detecting unit 3.

Also, while the embodiments of the present invention are shown and described as being applied to a notebook-sized computer apparatus, the embodiments of the present invention can be applied to a variety of input devices connected to an information processing apparatus such as a desktop type computer apparatus.

Specifically, the position detecting unit 3 which includes the first sense unit 31, the second sense unit 32, and the GND layer 316 may be constructed as a position detecting input device housed within a single casing. Accordingly, the position detecting input device can then be connected to a computer apparatus wirelessly or by a wire cable, such as a USB (universal serial bus) cable.

Alternatively, the embodiments of the present invention can be applied to input units of an information processing apparatus such as a PDA (personal digital assistant), an electronic dictionary, a mobile phone, a portable game machine, or the like.

Furthermore, while the previous embodiments of the present invention describe the first sense unit 31 as being included in the electrostatic capacitance position detecting unit 50 and the second sense unit 32 as being included in the electromagnetic position detecting unit 60, the embodiments of the present invention are not intended to be limited to this arrangement. For example, the first sense unit 31 can be formed as a position detecting unit capable of directly detecting touch on the operation surface of another detection system.

Although embodiments of the present invention have been shown and described, it will be appreciated by those skilled in the art that changes may be made in these embodiments without departing from the principles and spirit of the general inventive concept, the scope of which is defined in the appended claims and their equivalents.

What is claimed is:
1. An information processing apparatus, comprising:
a casing;

an operation surface disposed at a predetermined location of the casing and being operable from outside the casing;

a first sense unit disposed under said operation surface to electrically detect contact on said operation surface;

a second sense unit disposed under said operation surface and said first sense unit to detect a position of an external position pointing device with respect to the operation surface based on electromagnetic interaction generated between said second sense unit and an external position pointing device; and an auxiliary conductor disposed between said first sense unit and said second sense unit, said auxiliary conductor having a flat surface portion and a slit portion extending from one end of the flat surface portion to an inside of said flat surface portion.

2. The information processing apparatus according to claim 1, wherein:

said second sense unit is an electromagnetic sense unit including a plurality of loop coils to detect the position of the external position pointing device based on electromagnetic interaction generated between the external position pointing device and said loop coils; and the slit portion provided in said auxiliary conductor does not hinder electromagnetic interaction generated between said external position pointing device and said loop coils.

3. The information processing apparatus according to claim 2, wherein:

said first sense unit is a sense unit for detecting change of electrostatic capacitance generated between a first detecting electrode and a second detecting electrode when said operation surface is touched from outside the casing; and said auxiliary conductor is a ground electric potential portion of said first sense unit.

4. The information processing apparatus according to claim 2, further comprising:

a shield member provided on a lower portion of said second sense unit.

5. The information processing apparatus according to claim 2, further comprising:

a display portion and a display control unit for controlling a position of the pointer displayed on said display portion based on detection by said first and second sense units.

6. The information processing apparatus according to claim 5, wherein said display control unit reflects a change in a contact position detected by said first sense unit on said operation surface by changing a relative display position of the pointer and also reflects a change in a close position or a contact position detected by said second sense unit on said operation surface by changing an absolute display position of the pointer.

7. A computer apparatus, comprising:

a housing having a plurality of electronic components disposed therein; and a position detecting unit having an operation surface exposed outside the housing, the position detecting unit including an electrostatic component, an electromagnetic component, and a reference conductor disposed between the electrostatic component and the electromagnetic component, the reference conductor having a planar shape and at least one elongated cut-out portion extending into the planar shape from one side of the reference conductor toward another side of the reference conductor.

8. The computer apparatus according to claim 7, wherein the position detecting unit is capable of detecting when the operation surface is contacted and is capable of detecting when an external pointing device having a corresponding electromagnetic component approaches the operation surface.

9. The computer apparatus according to claim 7, wherein the position detecting unit detects a position of contact on the operation surface.

10. The computer apparatus according to claim 7, wherein an eddy current is generated in the reference conductor by operation of the electromagnetic component, the eddy current being limited in magnitude by the elongated cut-out portion.

11. The computer apparatus according to claim 7, further comprising:

a display screen for displaying a pointer that is moved therealong based on a position of contact on the operation surface detected by the positioned detecting unit.

12. The computer apparatus according to claim 7, wherein the electrostatic component comprises a capacitive sensor that detects contact on the operation surface based on changes in capacitance.

13. The computer apparatus according to claim 12, wherein the capacitive sensor comprises:

a first array of elongated conductors disposed below the operation surface and extending in a first direction; and a second array of elongated conductors disposed below the first array of elongated conductors and extending in a second direction, the first and second directions being different from each other, and the changes in capacitance being detected between the first and second elongated conductors with reference to an electrostatic potential of the reference conductor.

14. The computer apparatus according to claim 7, wherein the electromagnetic component comprises an electromagnetic sensor that detects electromagnetic interaction with an external pointing device.

15. The computer apparatus according to claim 14, wherein the electromagnetic sensor comprises:

a first array of loop coils disposed below the electrostatic component and extending in a first direction; and a second array of loop coils disposed below the first array of elongated conductors and extending in a second direction, the first and second directions being different from each other, and the first and second loop coils interacting with the external pointing device via electromagnetic waves.

16. The computer apparatus according to claim 7, wherein at least one of the electronic components is disposed beneath the position detecting unit in the casing.

17. The computer apparatus according to claim 16, wherein a conductive shield plate is disposed between the position detecting unit and the at least one electronic component disposed beneath the position detecting unit.

18. The computer apparatus according to claim 7, wherein the electrostatic and electromagnetic components of the position detecting unit comprise a plurality of conductive and insulative layers alternatingly formed under the operation surface.

19. The computer apparatus according to claim 7, wherein the reference conductor is a ground plate.

20. The computer apparatus according to claim 7, wherein the at least one elongated cut-out portion extends diagonally across the reference conductor.

21. A position detecting apparatus, comprising:

an operation surface;

a first sense unit to detect contact on said operation surface; and a second sense unit to detect a position of an external position pointing device with respect to the operation surface based on electromagnetic interaction generated between the external position pointing device and said second sense unit; and an auxiliary conductor disposed between said first sense unit and said second sense unit, said auxiliary conductor including a flat surface portion and a slit portion extending from one end of said flat surface portion to an inside of said flat surface portion.

22. The position detecting apparatus according to claim 21, wherein said auxiliary conductor has a plurality of slit portions formed in said flat surface portion.

23. The position detecting apparatus according to claim 22, wherein said plurality of slit portions include straight slits extending parallel to each other.

24. The position detecting apparatus according to claim 21, wherein:

said second sense unit is an electromagnetic sense unit including a plurality of loop coils to detect the position of said external position pointing device based on the electromagnetic interaction generated between said external position pointing device and said loop coils; and said loop coils and the slit portion provided on said auxiliary conductor do not hinder the electromagnetic interaction generated between said external position pointing device and said loop coils.

25. The position detecting apparatus according to claim 24, wherein:

said first sense unit is an electrostatic capacitance detecting unit to detect an operation applied to said operation surface based on a change in electrostatic capacitance between a first detecting electrode and a second detecting electrode; and said auxiliary conductor is a ground electric potential portion of said electrostatic capacitance detecting unit.

26. A position detecting apparatus, comprising:

at least one inductive component having electromagnetic characteristics;

at least one capacitive component disposed adjacent to the at least one inductive component and having electrostatic characteristics; and at least one ground plate disposed between the at least one inductive component and the at least one capacitive component, the at least one ground plate having at least one elongated slit formed therein, wherein the at least one inductive component generates an eddy current in the at least one ground plate, and the at least one elongated slit prevents the eddy current from flowing around the entire ground plate.

27. The position detecting apparatus according to claim 26, further comprising:

a detecting surface being engageable by an external object, wherein the at least one capacitive component detects a position of the external object if the external object contacts the detecting surface and the at least one inductive component detects a position of the external object if the external object includes another inductive component that interacts therewith.

28. The position detecting apparatus according to claim 26, wherein the elongated slit extends across a majority of the ground plate without extending through the entire ground plate.

29. The position detecting apparatus according to claim 26, wherein the elongated slit is curved.

30. The position detecting apparatus according to claim 26, wherein the ground plate comprises:

a first ground plate having a comb shape with a first plurality of elongated conductors defining a first plurality of slits therebetween; and a second ground plate having a comb shape with a second plurality of elongated conductors defining a second plurality of slits therebetween, the first and second ground plates being arranged such that the first elongated conductors are disposed in the second slits without contacting the second elongated conductors, and the second elongated conductors are disposed in the first slits without contacting the first elongated conductors.

31. An operation detecting sense part disposed under an operation surface, comprising:

a first sense unit to detect contact on said operation surface;

a second sense unit to detect a position of an external position pointing device with reference to said operation surface based on electromagnetic interaction generated between said sense unit and the external position pointing device; and an auxiliary conductor disposed between said first sense unit and said second sense unit, the auxiliary conductor including a flat surface portion and a slit portion extending from one end of said flat surface portion to an inside of said flat surface portion.

32. A position detecting device usable with a computer apparatus, the device comprising:

an electromagnetic pointing device;

an operation surface;

an electromagnetic sensing part disposed below the operation surface to detect said electromagnetic pointing device as said electromagnetic pointing device approaches or contacts the operation surface;

an electrostatic sensing part disposed above said electromagnetic sensing part and below the operation surface for detecting contact of said operation surface by a user's finger; and a ground plate disposed adjacent to the electromagnetic sensing part, the ground plate having a shape that corresponds to the operation surface and at least one elongated slit extending thereacross.

* * * * *